United States Patent [19]

Bardwick, III

[11] 3,734,222

[45] May 22, 1973

[54] INERTIAL ENERGY SYSTEM FOR VEHICLES

[76] Inventor: John Bardwick, III, 1733 West Ridge, Ann Arbor, Mich. 48105

[22] Filed: Dec. 9, 1970

[21] Appl. No.: 96,460

[52] U.S. Cl. ................................. 180/54 R, 74/751
[51] Int. Cl. ............................................. B60k 9/04
[58] Field of Search ........................... 180/1 R, 54 R; 74/751

[56] References Cited

UNITED STATES PATENTS

| | | | |
|---|---|---|---|
| 3,493,066 | 2/1970 | Dooley | 180/54 R |
| 3,476,201 | 11/1969 | Swaine | 180/65 |
| 2,935,899 | 5/1960 | Nallinger | 180/1 R |
| 2,656,733 | 10/1953 | Dicke | 180/1 R X |
| 2,525,946 | 10/1950 | Roberts | 74/751 |
| 2,803,151 | 8/1957 | Clerk | 74/751 |
| 2,118,590 | 5/1938 | Chilton | 74/751 X |

*Primary Examiner*—Robert G. Sheridan
*Assistant Examiner*—George F. Abraham
*Attorney*—Barnes, Kisselle, Raisch & Choate

[57] ABSTRACT

An inertial flywheel system for vehicles which includes clutch means for introducing energy to the flywheel from an engine or from a coasting or decelerating vehicle, and clutch means for transferring the stored energy to the vehicle on demand. A system of control is incorporated in the brake pedal, clutch pedal, accelerator and engine manifold. The control system operates the clutches in a manner which allows stored energy to be utilized to supplement the power plant of the vehicle and allows the kinetic energy normally lost in braking to be transferred instead to the flywheel. A speed control system transfers the braking function to the normal vehicle brakes when the quantity of stored energy reaches a predetermined maximum.

17 Claims, 4 Drawing Figures

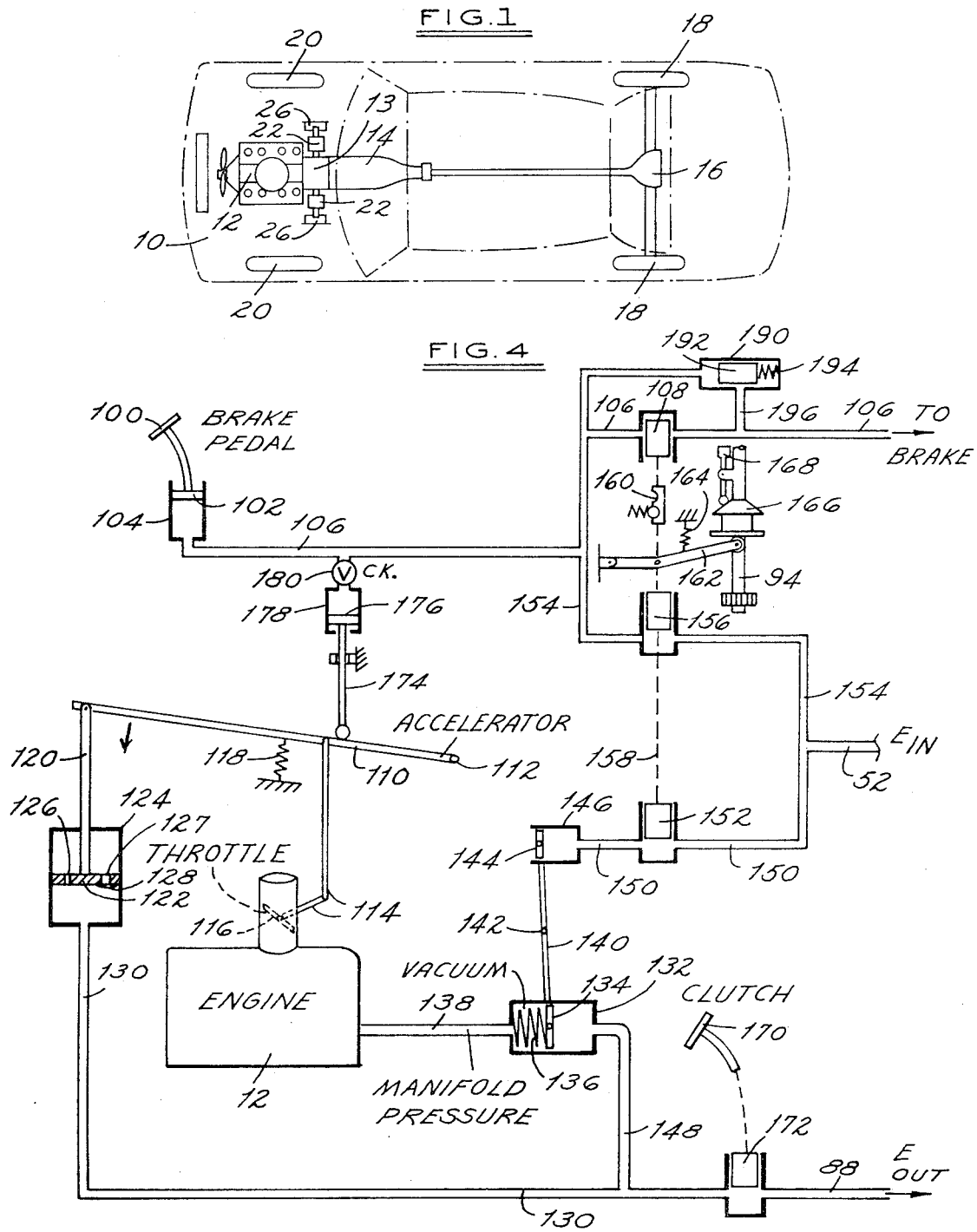

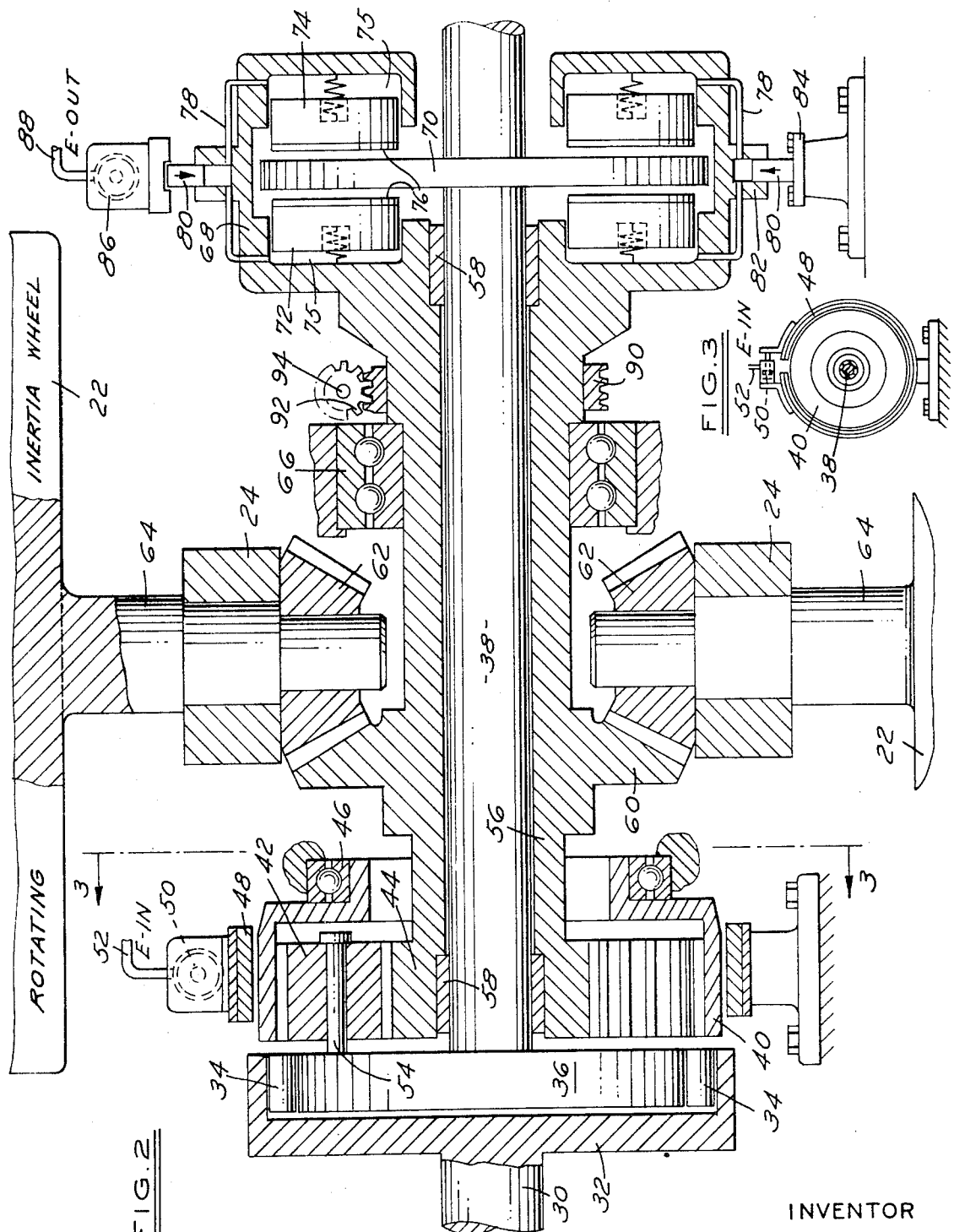

INERTIAL ENERGY SYSTEM FOR VEHICLES

This invention relates to an Inertial Energy System for Vehicles.

With the contemporary emphasis on ecology and environmental pollution, there is a desire to reduce the hydrocarbon, carbon monoxide, and other emissions from internal combustion engines used on the streets, roads, and highways. There is also a problem of fuel supply which may become more acute in the future and thus require a reduction in the consumption of hydrocarbon fuels. Coupled with these problems is the desirability of a vehicle which, for reasons of both safety and saleability, will have reasonable acceleration characteristics and good stability.

The present invention has for its object the provision of a powered vehicle which will couple a basic power unit with an inertial flywheel system in a manner that will permit storage of inertial energy at the least cost to the basic power unit, and to utilize this energy to provide supplemental power when desired for acceleration from a stop or while passing another vehicle or under other unusual load conditions.

Thus, it is an object of the invention to increase the efficiency of a vehicle power unit whether it is an internal combustion engine, a battery powered unit, a fuel cell, or a turbine. The ultimate object is thus to reduce pollution by decreasing the need for a high power engine to achieve desirable acceleration and to decrease the need for operating any selected power unit under conditions which are least efficient from the point of view of fuel consumption or emission of pollutants.

It is known that all moving vehicles have, associated with their motion, a kinetic energy equal to one-half their total mass times the square of the linear velocity plus an additional amount stored in rotating parts equal to one-half the moment of inertia times the square of the angular velocity. During the normal operation of present day vehicles this energy is supplied by the engine each time the vehicle accelerates, and the same amount of energy dissipated as heat in the brakes or engine every time the vehicle stops or slows.

The present invention contemplates the storing of energy from the vehicle engine at various times during the operation of the vehicle when the engine can most efficiently produce energy. It also contemplates the storing of the kinetic energy lost by the vehicle itself during deceleration, thus recapturing for later use, some of the energy normally dissipated as heat during braking. This stored energy can then be used (at any rate desired) during subsequent acceleration of the vehicle.

The present invention also makes it possible to obtain desired acceleration without introducing excessive quantities of fuel into an engine which causes highest pollutant emission. Similarly, the absence of drag on the engine in deceleration avoids excessive fuel waste and undesirable emissions.

Another object of the invention is the provision of manual and automatic controls for the storage and release of energy at propitious times to effect the highest efficiency of the input from the basic power unit or vehicle and of the output from the flywheel.

Other objects and features of the invention will be apparent in the following specification and claims wherein the principles of the invention are set forth together with the best mode presently contemplated for the practice of the invention.

DRAWINGS accompany the disclosure and the various views thereof may be briefly described as:

FIG. 1, a schematic view of a vehicle chassis showing the relationship of the parts.

FIG. 2, a sectional view of the coupling mechanism used to transfer energy to and from the inertial wheel. This view is essentially schematic in presentation to show the parts of the mechanism.

FIG. 3, a view on line 3—3 of FIG. 2 showing a clutch mechanism.

FIG. 4, a diagrammatic view of a control system.

REFERRING TO THE DRAWINGS:

A vehicle chassis is shown in FIG. 1 having a body 10, an engine 12, the coupling mechanism 13, a clutch and transmission housing 14, a differential 16, and rear drive wheels 18. The vehicle wheels are standard dirigible wheels 20 for steering. On either side of the coupling mechanism 13 is shown an inertial wheel 22. These may be singular or in plurality depending on the location and the need or desire to balance the vehicle statically and dynamically. If one flywheel is used, it is preferred that its direction of rotation be opposite to that of the forward direction of the wheels of the vehicle and in most cases the axis of rotation should be transverse of the vehicle.

In FIG. 2, these inertial wheels are shown partially in section to indicate that they are of solid configuration to maximize the strength and capacity. The inertial wheels are mounted on bearings 24 illustrated in FIG. 2 and with an end mount 26 with suitable bearings as shown in FIG. 1.

REFERRING to FIG. 2, the drive shaft of the engine is shown at 30 with a clutch case 32 housing a one-way roller clutch having rollers 34 and an inner drive member 36 attached to an output drive shaft 38. Associated with the output plate 36 of clutch 32 is a planetary set which consists of a ring gear housing 40, planetary gears 42 which would be three in number, and a sun gear 44. The housing 40 is mounted in bearings 46 and has a braking surface on the outside which cooperates with a band brake 48 actuated by a hydraulic piston-cylinder combination 50 receiving fluid through a conduit 52. The planetary gears 42 are mounted on suitable bearing posts 54 which extend axially from the clutch plate 36.

The sun gear is mounted at one end of a rotary housing indicated generally at 56, this housing being mounted around the shaft 38 on end bearings 58 and having between its ends a bevel gear 60 which meshes with bevel gears 62 to drive shafts 64 on the inertial wheels 22. The outer bearing 66 also supports the housing 56 to the right of the bevel gears 62. The right-hand end of the rotary member 56 terminates in a housing 68 which partially surrounds a friction disc 70 on shaft 38. Circular pistons 72 and 74 mounted in annular recesses 75 in the housing 68 have friction surfaces 76 which are movable into contact with the opposite radial sides of the disc 70 to create a braking effect in response to hydraulic pressure through lines 78 to the annular recesses 75. The hydraulic pressure is developed in the annular recesses 75 by radial pistons 80 circumferentially spaced around a flange 82 on housing 68 and actuated by restricting band 84 controlled by a piston-cylinder combination 86 with pressure through a tube 88. Also mounted around the housing 56, which is just to the right of the bearing 66, is a worm gear 90 which drives a worm wheel 92 on a shaft 94 found also in FIG. 4.

With reference to the structure thus far described, it will be appreciated that the driving of the input shaft 30 will cause rotation of the shaft 38 through the roller clutch 34. This energy will be transmitted through standard clutch and transmission to the drive wheels 18. When it is desired to put energy into the inertial wheels 22, the tube 52, which can also be designated E-in (Energy-in) is pressurized, causing the clamping of the brake shoe 48 on the housing 40, thus energizing the planetary set so that power is transmitted to the housing 56 and through the bevel gears 60 and 62 to the wheels 22, thus driving them into a state where they are storing kinetic energy. Slippage will occur at this brake shoe while energy is being transferred.

In order to transmit energy from these wheels to the drive shaft of the vehicle, it is necessary to pressurize the tube 88, sometimes referred to as E-out. This pressurizes the cylinder chamber 75 driving the pistons 72 and 74 against the friction plate 70 so that the housing 56 will become a driving housing from the wheels 22 to transmit energy out of the wheels into the general vehicle system.

The inertial system can be incorporated into the vehicle operation by a control system which is initiated and maintained by the usual operator controls such as accelerator, brake, and clutch. If desired, separate manual controls could be utilized.

A control system, illustrated in FIG. 4, is provided for a standard transmission vehicle. The diagrammatic presentation of FIG. 4 shows a brake pedal 100 operating a piston 102 in cylinder 104 which discharges pressure through a conduit 106 to a braking system not shown. A valve member 108 closes the conduit 106 under certain conditions. The accelerator pedal 110 of the vehicle is pivoted at 112 and is shown with suitable linkage 114 to control a throttle plate 116 in a carburetor of the engine. The accelerator is moved against a spring 118 and also has an extension which controls a plunger rod 120 which drives a piston 122 in a cylinder 124. The piston has a small pass through orifice 126 and a larger pass through opening 127 which is controlled by a normally closed check valve 128. When the accelerator is pushed down initially, fluid in the cylinder will be moved through a conduit 130 to the conduit 88 referred to as the E-out conduit.

When the motion of the accelerator stops, the orifice 126 allows fluid to pass through the piston thus relieving the pressure in conduit 130 after a predetermined period. When the accelerator is released, check valve 128 opens allowing free passage of fluid back through the piston. In addition, when the accelerator is released, plunger rod 174 connected to piston 176 is actuated pressurizing cylinder 178. This pressure is applied, through check valve 180, to conduit 106.

A piston-cylinder arrangement responsive to engine vacuum is also provided. Cylinder 132 has a piston 134 which is actuated by a spring 136 to the right as viewed in FIG. 4. This piston is responsive to the manifold pressure of the engine through a tube 138. The position of the piston 134 responds in a lever 140 pivoted at 142 and having its other end associated with a piston 144 in a cylinder 146. One end of the cylinder 132 is connected through a conduit 148 to the conduit 130. The outlet of the cylinder 146 is connected through a conduit 150 through a close-off valve 152 to the conduit 52 which is the E-in conduit. The circuit is completed by a conduit 154 controlled by a valve 156 also leading to conduit 52.

The valves 108, 156, and 152 are connected for simultaneous motion, through a shaft 158, and preferably controlled by a detent system 160 which results in movement from one defined position to a second defined position. Another input is introduced to the shaft 158 through a lever 162 urged upwardly by a spring 164. This lever is a follower of a centrifugally responsive member 166 mounted around a shaft 94 driven by the worm wheel 92 previously described in connection with FIG. 2. A centrifugally responsive member 168 cams the member 166 downwardly as the speed of the shaft 94 increases, thus moving the lever 162 at a certain point to a position to close the valves 156 and 152 while opening the valve 108. A normal clutch pedal 170, in addition to its regular function, controls a valve 172 in conduit 130.

A safety brake by-pass can be provided as shown in FIG. 4. Normal braking pressure will apply pressure to cylinder 190, tending to move piston 192 to the right. Compression spring 194 is stiff enough to prevent sufficient movement of piston 192 to open line 196. Extra heavy pressure on the brake pedal will compress spring 194 enough to open line 196, allowing emergency braking regardless of the operation (or non-operation) of any other parts of the system.

With respect to the general system, it will be seen that energy can be transferred to the flywheel or flywheels 22, which may be either a singular flywheel or a double flywheel, either from the vehicle engine when it is not being used to capacity, or from the drive wheels of the vehicle to absorb the kinetic energy of the moving vehicle. The stored energy can then be used to assist in the acceleration of the vehicle. This makes it possible to gain the desired acceleration while using a smaller engine which can easily maintain the desired cruising speed, thus reducing the overall fuel consumption and reducing the pollution which normally results from full throttle operation of an internal combustion engine.

It will be appreciated that the highest pollutant emission occurs during rapid acceleration of an engine when excessive fuel is being fed to obtain the necessary power, and during deceleration in a normal vehicle when fuel drawn into the engine is not being utilized (burned) to the fullest extent.

Pollutants normally emitted by an internal combustion engine during deceleration (mainly unburned hydrocarbons) are reduced by decoupling the engine from the drive wheels through the one-way roller clutch 32 and putting the energy normally expanded in braking back into the flywheel. This, of course, reduces the wear on the brake lining during deceleration in addition to recapturing some of the energy that had been expended during the previous acceleration.

With respect to the operation of the particular control system shown in FIG. 4, it is assumed that the system is fully charged hydraulically. When the engine is started, the inertial wheels will be rotated to a top speed by the engine by pressure from cylinders 178 and 146 both of which pressurize the piston-cylinder 50 and close the band clutch 40 if the engine is at idle. When the accelerator 110 is depressed, the piston 122 will pressurize the conduit 130 leading to the E-out energization of conduit 88. Assuming that the clutch is not depressed to close valve 172, energy from the rotating inertial wheels will be transmitted to the drive shaft 38 because of pressure in the piston-cylinder combination 86 and in the annular cylinders 75, thus tending to lock the rotating assembly 56 to the friction disc 70.

The orifice 126 will generally relieve the pressure in passage 130 after the accelerator has been depressed a certain brief time, but the increase in the manifold pressure in the conduit 138 will allow the spring 136 to move piston 134 to a point that it will pressurize the passage 130, thus continuing the E-out condition. The movement of the piston 134 also shifts the lever 140 to decrease the pressure in cylinder 146 to relieve the pressure in conduit 150 and 52. Thus, up to a certain point, the energy will feed from the inertial wheel or wheels to the general drive shaft of the vehicle. When the vehicle reaches a certain speed wherein additional acceleration energy is not required, the engine 12 can drive the vehicle without assistance at an efficient operation speed. This condition is indicated by a decreased manifold pressure. At this time, it is desirable to disengage the inertial wheels from the drive shaft by relieving the pressure in the conduit 88, which is accomplished by vacuum on the left side of piston 134.

If, while cruising, the accelerator pedal is released, piston 176 applies a slight pressure to conduit 106 which will cause the vehicle to decelerate slightly. The deceleration will be caused either by the brakes or by pressurization of E-in conduit 52 depending on the position of valves 108, 156, and 152.

When it is desired to brake the vehicle, the foot pedal 100 is pushed which pressurizes conduit 106 to put pressure in the conduit 52 and thence to piston-cylinder 50. This will close the band brake 48 to cause the input of energy from shaft 38 to the rotating element 56 to increase rotation of the inertial wheels, thus causing a general braking of the vehicle and storing the braking energy in the wheels. When the shaft 94 reaches a certain speed, the centrifugally responsive element 166 will shift the lever 162 and shaft 158 to block the passages 154 and 150 so that the band brake 48 is released and open the passage 106 so that the regular brakes of the system will take over through the conduit 106. If the car is brought to a stop, the idling system will cause the shifting of the piston 134 to the left by reason of the higher vacuum, thus again tending to energize conduit 52, E-in. If the flywheel is not at its maximum speed of rotation, valves 152 and 156 will be open (caused by spring 164) and conduit 52 will be pressurized causing energy to be fed to the flywheel. Once the flywheel attains maximum speed, lever 162 closes valves 152 and 156 and no more energy is fed to the flywheel.

I claim:

1. In combination with an operator controlled vehicle having a power plant to impart motion to the vehicle drive wheels, that improvement which comprises:
   a. a flywheel mounted for rotation on the vehicle independent of the power plant and the drive wheels,
   b. a machine element for driving said flywheel,
   c. first means selectively operable to connect said element to said power plant to impart rotation to said flywheel to store kinetic energy therein and alternatively to impart kinetic energy from said moving vehicle to said flywheel,
   d. second means selectively operable to connect said element to said drive wheels to impart stored kinetic energy to said wheels and motion to said vehicle,
   e. means to relate said connecting means wherein each operates selectively and alternately with respect to the other,
   f. said first means including a pressure operated brake and a pressure system to operate said brake, and
   g. means in said system to block pressure to said brake in response to a predetermined flywheel speed.

2. In combination with an operator controlled vehicle having a power plant to impart motion to the vehicle drive wheels, that improvement which comprises:
   a. a flywheel mounted for rotation on the vehicle independent of the power plant and the drive wheels,
   b. a machine element for driving said flywheel,
   c. first means selectively operable to connect said element to said power plant to impart rotation to said flywheel to store kinetic energy therein and alternatively to impart kinetic energy from said moving vehicle to said flywheel,
   d. second means selectively operable to connect said element to said drive wheels to impart stored kinetic energy to said wheels and motion to said vehicle,
   e. means to relate said connecting means wherein each operates selectively and alternately with respect to the other, and
   f. said first and second means being operated by fluid pressure, and a fluid pressure system associated with said vehicle comprising a first cylinder for operating said first means, a second cylinder for operating said second means, a third pressure cylinder responsive to brake pressure of a brake pedal, a fourth cylinder responsive to accelerator pressure of an acceleration pedal, and connecting lines between said first and third cylinders and between said second and fourth cylinders, whereby actuation of said brake cylinder causes response in said first cylinder, and actuation of said accelerator pedal causes a response in said second cylinder.

3. A system as defined in claim 2, in which a control valve is provided responsive to clutch pressure of a clutch mechanism, said valve controlling the connecting lines between the second and fourth cylinders whereby actuation of said clutch pedal blocks the response of said second cylinder to operation of said accelerator pedal.

4. A system as defined in claim 2 in which a fifth pressure cylinder connected in said lines is responsive to manifold pressure of an internal combustion engine driving said vehicle to actuate said first cylinder and said first means in response to no-load conditions of said engine.

5. A system as defined in claim 2 in which a speed responsive means influenced by means reflecting the speed of said flywheel is operative on said first cylinder to effect a connection between said power plant and said flywheel at speeds of said flywheel below a predetermined rate.

6. In combination with an operator-controlled vehicle having an internal combustion engine power plant to impart motion to the vehicle drive shaft and drive wheels, that improvement which comprises:
   a. a flywheel mounted for rotation on the vehicle independent of the power plant and the drive wheels, b. a vehicle drive shaft connectable to said engine and said wheels,
c. a first clutch means engageable to connect said drive shaft to said flywheel to impart rotation to said flywheel,
d. a second clutch means engageable to connect said flywheel to said drive shaft to impart rotation to said shaft from said flywheel,
e. a control system for said vehicle which operates said clutch means selectively to distribute inertial energy of said wheel and said vehicle, and
f. said control system cooperating with a brake pedal, an accelerator pedal, and a manifold vacuum source and comprising a fluid pressure system including,
 1. a first pressure developing unit responsive to down pressure on an accelerator pedal,
 2. a second pressure developing unit responsive to up pressure on an accelerator pedal,
 3. a third pressure developing unit responsive to brake pedal pressure,
 4. a fourth pressure developing unit responsive to manifold vacuum,
 5. a fifth pressure developing unit responsive to absence of manifold vacuum,
 6. first means to actuate said first clutch means,
 7. second means to actuate said second clutch means,
 8. means connecting said second, third, and fourth pressure developing units to said first means, and
 9. means connecting said first and fifth pressure developing units to said second means,
wherein said clutch means are operated sequentially in the normal operation of the vehicle to transfer kinetic energy to and from the flywheel and to and from the vehicle.

7. A combination as defined in claim 6 in which a control means responsive to the speed of said flywheel is operatively associated with said second, third, and fourth pressure developing units to effect operation of said first clutch means under conditions of speed of said flywheel below a predetermined kinetic energy storage condition.

8. A combination as defined in claim 7 in which said control means comprises a valve system operable to close pressure from said means to actuate said first clutch means under said predetermined conditions.

9. A combination as defined in claim 6 in which a foot clutch pedal in the vehicle is provided, and a control valve operable by disengagement motion of said clutch pedal in a line leading to said "second means to actuate said second clutch means" to block operation of said second clutch means when said foot clutch pedal is depressed.

10. A combination as defined in claim 2 in which a by-pass emergency pressure line is interposed between said third pressure developing unit and a brake line responsive to predetermined operator pressure to effect vehicle braking independently of flywheel speed.

11. In combination with an operator-controlled vehicle having a power plant to impart motion to the vehicle drive wheels, that improvement which comprises:
a. a flywheel mounted for rotation on the vehicle independent of the power plant and the drive wheels,
b. a machine element for driving said flywheel,
c. first means selectively operable to connect said element to said power plant to impart rotation to said flywheel to store kinetic energy therein and alternatively to impart kinetic energy from said moving vehicle to said flywheel,
d. second means selectively operable to connect said element to said drive wheels to impart stored kinetic energy to said wheels and motion to said vehicle,
e. means to relate said connecting means wherein each operates selectively and alternately with respect to the other,
f. said first means including a pressure operated brake and a pressure system to operate said brake,
g. means in said system to block pressure to said brake in response to a predetermined flywheel speed, and
h. a by-pass emergency circuit response to a predetermined operator signal to conduct pressure to said pressure operated brake independent of said flywheel speed.

12. In combination with an operator controlled vehicle having a power plant to impart motion to the vehicle drive wheels, an accelerator lever for controlling the speed of the power plant and a brake pedal for controlling pressure to a brake line,
a. a flywheel mounted for rotation on the vehicle independent of the power plant and the drive wheels,
b. a machine element for driving said flywheel,
c. first means selectively operable to connect said element to said power plant to impart rotation to said flywheel to store kinetic energy therein and alternatively to impart kinetic energy from said moving vehicle to said flywheel,
d. second means selectively operable to connect said element to said drive wheels to impart stored kinetic energy to said wheels and motion to said vehicle,
e. a mechanism to actuate said second means,
f. a motion developing means responsive to advance accelerator lever action to impart a motion to said mechanism upon acceleration motion of said lever to cause transfer of stored kinetic energy to said wheels, and
g. means connected to said motion developing means to effect retraction of said mechanism following a predetermined time lapse.

13. In combination with an operator-controlled vehicle having a power plant to impart motion to the vehicle drive wheels, an accelerator lever for controlling the speed of the power plant and a brake pedal for controlling pressure to a brake line,
a. a flywheel mounted for rotation on the vehicle independent of the power plant and the drive wheels,
b. a machine element for driving said flywheel,
c. first means selectively operable to connect said element to said power plant to impart rotation to said flywheel to store kinetic energy therein and alternatively to impart kinetic energy from said moving vehicle to said flywheel,
d. second means selectively operable to connect said element to said drive wheels to impart stored kinetic energy to said wheels and motion to said vehicle,
e. a pressure responsive mechanism to actuate said second means,
f. a pressure developing means responsive to advance accelerator lever action to impart a pressure to said pressure responsive mechanism upon advance motion of said lever to cause immediate transfer of stored kinetic energy to said wheels, and g. means connected to said piston-cylinder combination to relieve developed pressure therein following a predetermined time lapse.

14. A combination as defined in claim 12 including a second mechanism to actuate said first means, a motion developing means responsive to retractive acceleration lever action to impart a motion to said second mechanism to cause transfer of kinetic energy of said vehicle to said flywheel.

15. A combination as defined in claim 13 including a second pressure responsive mechanism to actuate said first means, a pressure developing means responsive to retractive acceleration lever action to impart a pressure to said second pressure responsive mechanism upon retractive motion of said lever to cause transfer of kinetic energy of said vehicle to said flywheel.

16. In combination,
a. a vehicle having a power plant and drive shaft to impart motion to vehicle drive wheels and a transmission interposed between said power plant and said drive wheels to relate said shaft and said wheels in varying speed ratios,
b. a one-way clutch between said power plant and said drive shaft to permit power transmission from said power plant to said shaft,
c. a flywheel mounted for rotation on said vehicle independently of the power plant and the drive wheels,
d. a multiple speed flywheel transmission interposed between said flywheel and said shaft and friction means associated therewith to effect through said transmission and the slipping of said friction means an infinitely variable speed ratio between said flywheel and said shaft, to impart power plant power to said flywheel and vehicle wheel motion to said flywheel, and, alternatively, to impart flywheel energy to said vehicle, and
e. operator-controlled means and engine responsive means for actuating said friction means in connection with the normal operation of the vehicle selectively to effect interchange of kinetic energy between said vehicle and said flywheel including interchange of energy throughout the entire range of acceleration.

17. A combination as defined in claim 16 wherein said friction means comprises a machine element for driving said flywheel, a first clutch means for connecting said machine element and said shaft at a predetermined ratio, and a second clutch means for connecting said machine element and said shaft at another predetermined ratio.

* * * * *